(12) United States Patent
Dudek et al.

(10) Patent No.: US 6,464,372 B1
(45) Date of Patent: Oct. 15, 2002

(54) LAMP DEVICE AND ASSEMBLY

(75) Inventors: Peter A. Dudek, Manchester, NH (US); Howard B. Eng, Hancock, NH (US); Rolland B. Hall, Keene, NH (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/605,790

(22) Filed: Jun. 27, 2000

(51) Int. Cl.⁷ .............................................. F21V 23/00
(52) U.S. Cl. .................... 362/222; 362/31; 362/223; 362/265
(58) Field of Search .................... 362/26, 27, 31, 362/223, 293, 330, 551, 583, 470, 263, 265, 222

(56) References Cited

U.S. PATENT DOCUMENTS

| | | | | |
|---|---|---|---|---|
| 2,609,436 A | * | 9/1952 | Sermeus | 362/31 |
| 4,084,215 A | * | 4/1978 | Willenbrock | 362/470 |
| 4,535,396 A | * | 8/1985 | Guthrie | 362/293 |
| 4,593,345 A | * | 6/1986 | Beggs | 362/470 |
| 4,913,511 A | * | 4/1990 | Tabalba et al. | 385/88 |
| 5,136,481 A | * | 8/1992 | Dietzsch et al. | 362/470 |
| 5,146,354 A | * | 9/1992 | Plesinger | 349/59 |
| 5,253,089 A | * | 10/1993 | Imai | 349/65 |
| 5,558,420 A | * | 9/1996 | Oki et al. | 362/31 |
| 5,649,039 A | * | 7/1997 | Benzoni et al. | 385/78 |
| 5,702,179 A | * | 12/1997 | Sidwell et al. | 362/293 |
| 5,990,989 A | * | 11/1999 | Ozawa | 362/31 |
| 6,195,196 B1 | * | 2/2001 | Kimura et al. | 362/31 |
| 6,356,686 B1 | * | 3/2002 | Kuczynski | 385/39 |

\* cited by examiner

Primary Examiner—Alan Cariaso
(74) Attorney, Agent, or Firm—William E. Meyer

(57) ABSTRACT

A lamp assembly is provided which includes a low pressure discharge lamp disposed between a light bar and a housing. The light bar provides internal reflection of light reflected by the lamp from an input surface to an output surface. The light bar and the housing collect electro-magnetic interference generated by the lamp.

9 Claims, 3 Drawing Sheets

LAMP DEVICE AND ASSEMBLY

TECHNICAL FIELD

The present invention relates to a lamp device and a lamp assembly including such a lamp device useful in suppressing electro-magnetic interference and directing light as desired. The present invention particularly relates to such a lamp device and lamp assembly useful in connection with a vehicle.

BACKGROUND ART

The lamp device and lamp assembly of the present invention is illustrated herein with reference to a lamp for use with a motor vehicle. However, it will be apparent to those skilled in the art that the present invention is not limited to such an application.

The use of a motor vehicle stop lamp is well known. One of the concerns regarding such a lamp is providing a lamp which satisfactorily directs a beam of light during use. Another concern is the desire to substantially reduce of eliminate any electro-magnetic interference created by the lamp. These concerns are particularly troublesome when low pressure discharge lamps are considered as the source of light. Low pressure discharge lamps such as conventional neon lamps are very efficient sources of light. However, such lamps are diffuse sources of light which makes a directed beam of light difficult to achieve. Low pressure discharge lamps are also sources of electro-magnetic interference created as the lamp discharge extends across the discharge cavity. Electro-magnetic interference is particularly undesirable when present in an automobile due to the presence of various electronic devices operating in the vehicle, including without limitation a radio. For example, electro-magnetic interference tends to interfere with the reception of the radio.

Various efforts have been made to eliminate electro-magnetic interference in automotive lamp applications. For example, different types of grounding schemes have been attempted with varying degrees of success. One attempt has involved applying Indium Tin Oxide on glass or plastic surfaces associated with the automotive lamp. However, it is difficult to apply Indium Tin Oxide to glass or plastic, and such application tends to be very expensive. Another attempt has involved the use of screen mesh with the lens of an automotive lamp. However, the use of screen mesh is not without problems, the assembly of a lamp using screen mesh being very difficult. For example, it is difficult to assemble the screen mesh in a uniform manner on the lamp or contouring inside lenses. Such problems tend to increase the cost of the lamp. During use of the lamp, the screen mesh greatly reduces light output.

DISCLOSURE OF THE INVENTION

It is an object of the present invention to provide an improved lamp device and lamp assembly.

Another object of the present invention is to provide an improved lamp device and lamp assembly which obviates the disadvantages of the prior art.

Yet another object of the present invention is to provide an improved lamp device and lamp assembly which provides the required directed beam of light.

A further object of the present invention is to provide an improved lamp device and lamp assembly which provides little or no electro-magnetic interference during use thereof.

Another object of the present invention is to provide an improved lamp device and lamp assembly useful in providing a very efficient light source.

A further object of the present invention is to provide an improved lamp device and lamp assembly which may be readily fabricated relatively inexpensively.

Yet another object of the present invention is to provide an improved lamp device and lamp assembly the use of which does not substantially reduce light output.

Another object of the present invention is to provide an improved lamp device and lamp assembly useful with a low pressure discharge lamp.

It is still another object of the present invention to provide an improved lamp device and lamp assembly useful as a vehicular lamp.

This invention achieves these and other objects by providing a lamp device, comprising, a light transmissive light bar structured and arranged for coupling a lamp thereto. The light bar comprises an input surface, an output surface and a body segment extending therebetween. The body segment is structured and arranged for reflection therein of, and collection of electro-magnetic interference emitted by, light projected through the light bar by the lamp from the input surface to the output surface.

A low pressure discharge lamp assembly comprising such a lamp device is also provided. In particular, a light transmissive light bar is provided having an input surface, an output surface and a body segment extending therebetween. The body segment is structured and arranged for reflection therein of, and collection of electro-magnetic interference emitted by, light projected through the light bar from the input surface to the output surface. A low pressure discharge lamp is coupled to the light bar adjacent the input surface. The lamp is structured and arranged to project light through the light bar from the input surface to the output surface.

BRIEF DESCRIPTION OF THE DRAWINGS

This invention may be clearly understood by reference to the attached drawings in which like reference numerals designate like parts and in which:

FIG. 4 is an end view of another embodiment of the present invention.

MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
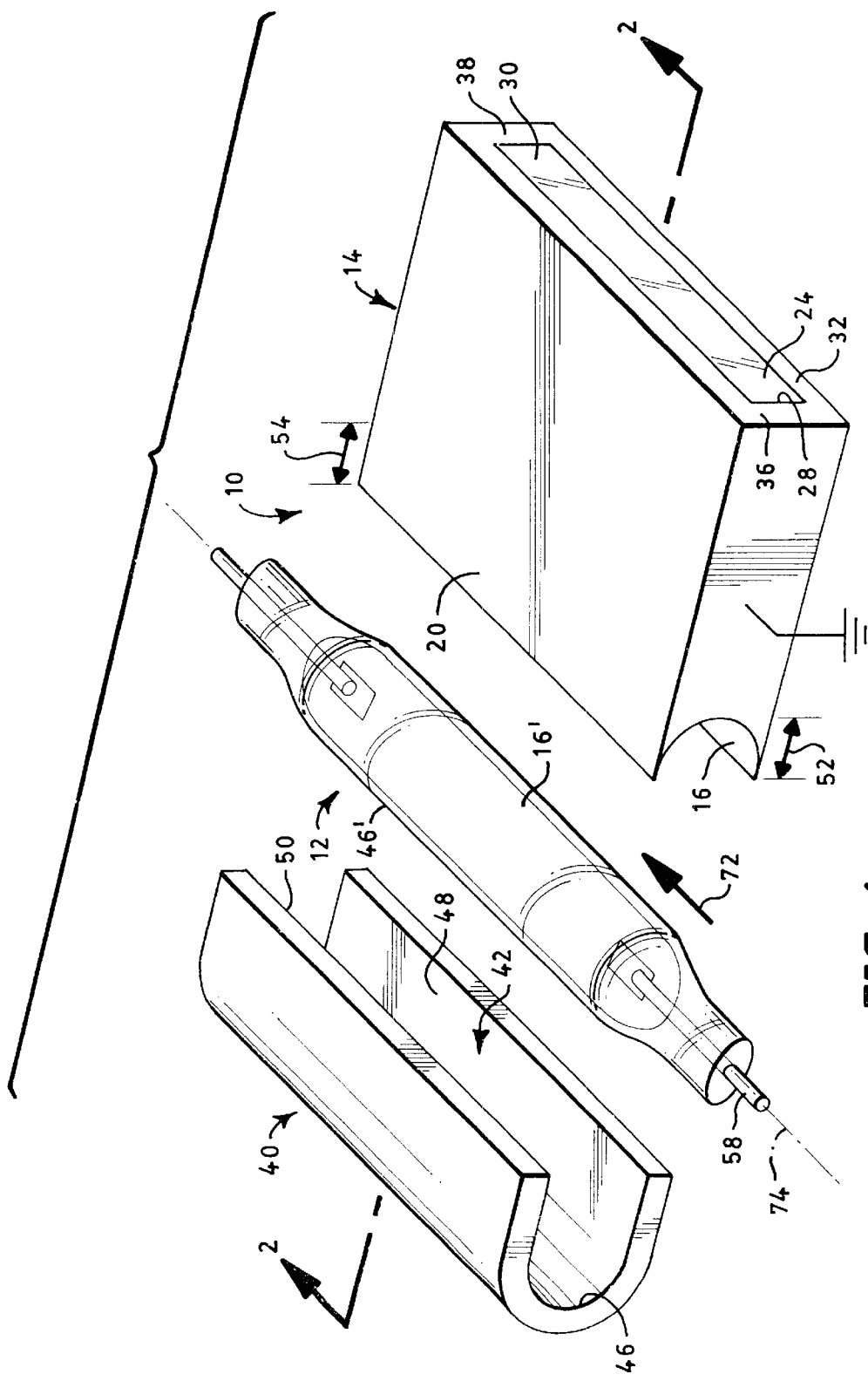
FIG. 1 is an exploded view of one embodiment of the present invention.
Figure 2:
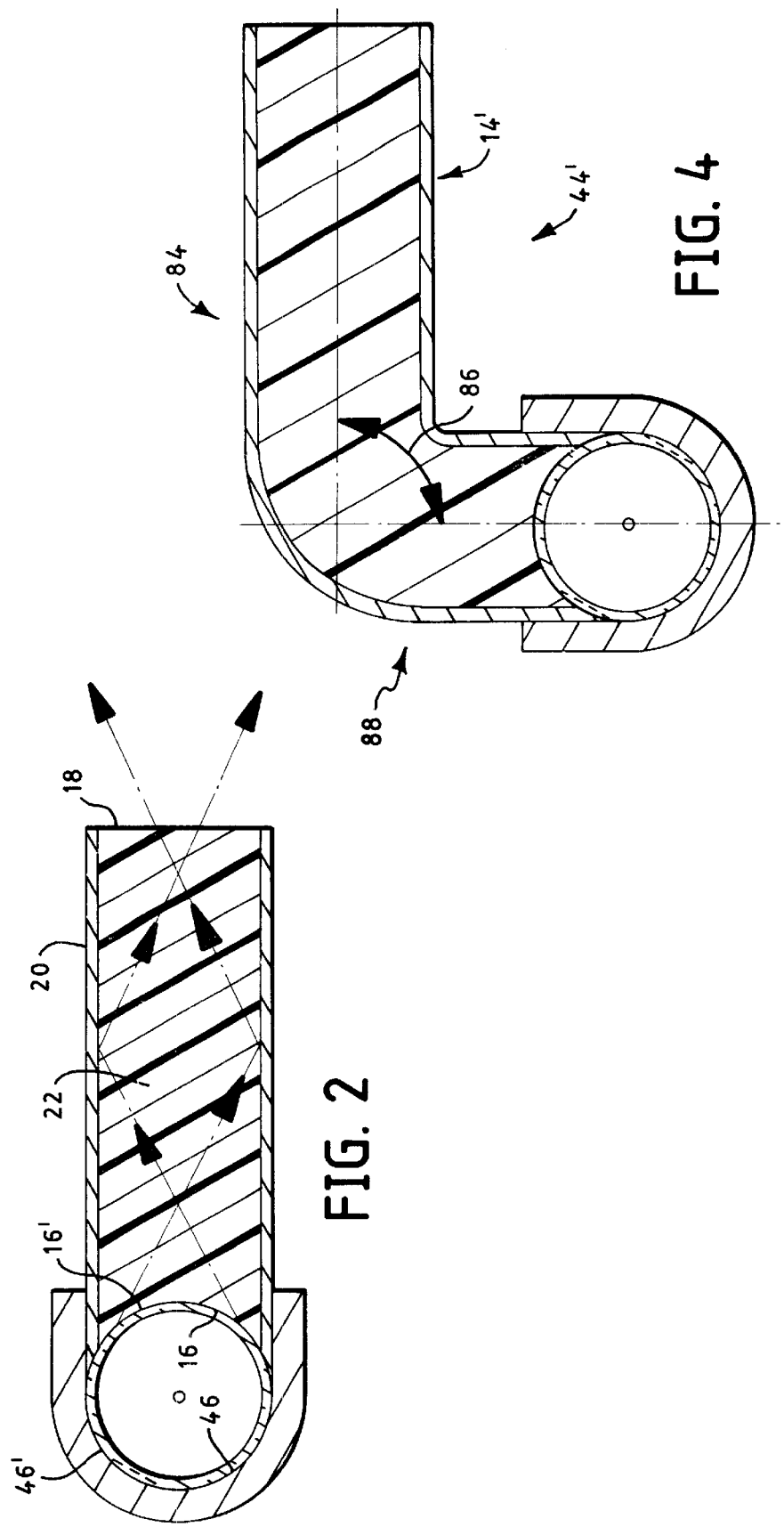
FIG. 2 is a cross-section of FIG. 1 taken along lines 2—2.

FIGS. 1 and 2 illustrate one embodiment of a lamp device 10 of the present invention. Lamp device 10 is for use with a low pressure discharge lamp such as a conventional elongated neon lamp 12. Lamp device 10 comprises a light bar 14 which includes an input surface 16, an output surface 18 and a body segment 20 extending therebetween.

In one embodiment of the present invention, the body segment may comprise a portion having one or more guide surfaces extending between the input surface and the output surface, and a conductive exterior layer applied to such portion of the body segment. The guide surfaces reflect the light internally of such portion of the body segment in a manner similar to that of a fiber optic. The conductive exterior layer is grounded in a conventional manner and collects electro-magnetic interference from the light as it travels through the body segment from the input surface to the output surface.

In the embodiment illustrated in FIGS. 1 and 2, body segment 20 includes a portion 22. Without limitation, the portion 22 may be fabricated from a plastic resin material one example of which is a high quality optically clear polycarbonate. Such material is useful in minimizing light loss. Portion 22 comprises two pairs of opposing guide surfaces, including a first pair formed by opposing surfaces 24, 26 and a second pair formed by opposing surfaces 28, 30. Each surface 24, 26 and 28, 30 comprises a conductive and reflective exterior layer 32, 34 and 36, 38, respectively. Layers 32, 34 and 36, 38 are grounded so as to collect electro-magnetic interference emitted by the reflected light within the light bar 14 as such light is being projected therethrough by lamp 12. In the embodiment illustrated in FIGS. 1 and 2, the layers 32, 34, 36 and 38 serve to reflect the light within the body segment 20 as well as to collect the electro-magnetic interference. Without limitation, such layers may be provided, for example, by metal coating or other metalization process. Metalization on plastic components is a well known and economical process which may be affected with a high degree of efficiency. Grounding of such layers may be provided in a conventional manner such as by electrically and mechanically connecting the layers to the chassis of an automobile.

In one embodiment of the lamp device of the present invention, a housing is provided which is structured and arranged to further reflect light projected by the lamp 12 within the body segment 20. Such housing may also serve to further collect electro-magnetic interference emitted by the light. For example, in the embodiment illustrated in FIGS. 1 and 2, the lamp device 10 includes a housing in the form of an elongated conductive bracket 40. One or more brackets 40 may be provided. FIGS. 1 and 2 illustrate one bracket 40 which has a C-shaped configuration which forms an aperture 42 into which the lamp 12 may be inserted. Bracket 40 is configured to mate with the lamp 12 and light bar 14 to form a lamp assembly 44 of the present invention. For example, in the embodiment illustrated in FIGS. 1 and 2, bracket 40 is configured at 46 to conformally mate with a portion 46' of the elongated envelope of lamp 12. Bracket 40 is further configured to include portions 48, 50 which conformally mate with lengths 52 and 54, respectively, of the exterior layer 32 and 34, respectively. In the embodiment illustrated in FIGS. 1 and 2, the input surface 16 is configured to conformally mate with a portion 16' of the elongated envelope of lamp 12, and the lamp 12 is coupled to the light bar 14 by the bracket 40, the lamp thereby being arranged to project light through the light bar from the input surface 16 to the output surface 18.

Figure 3:
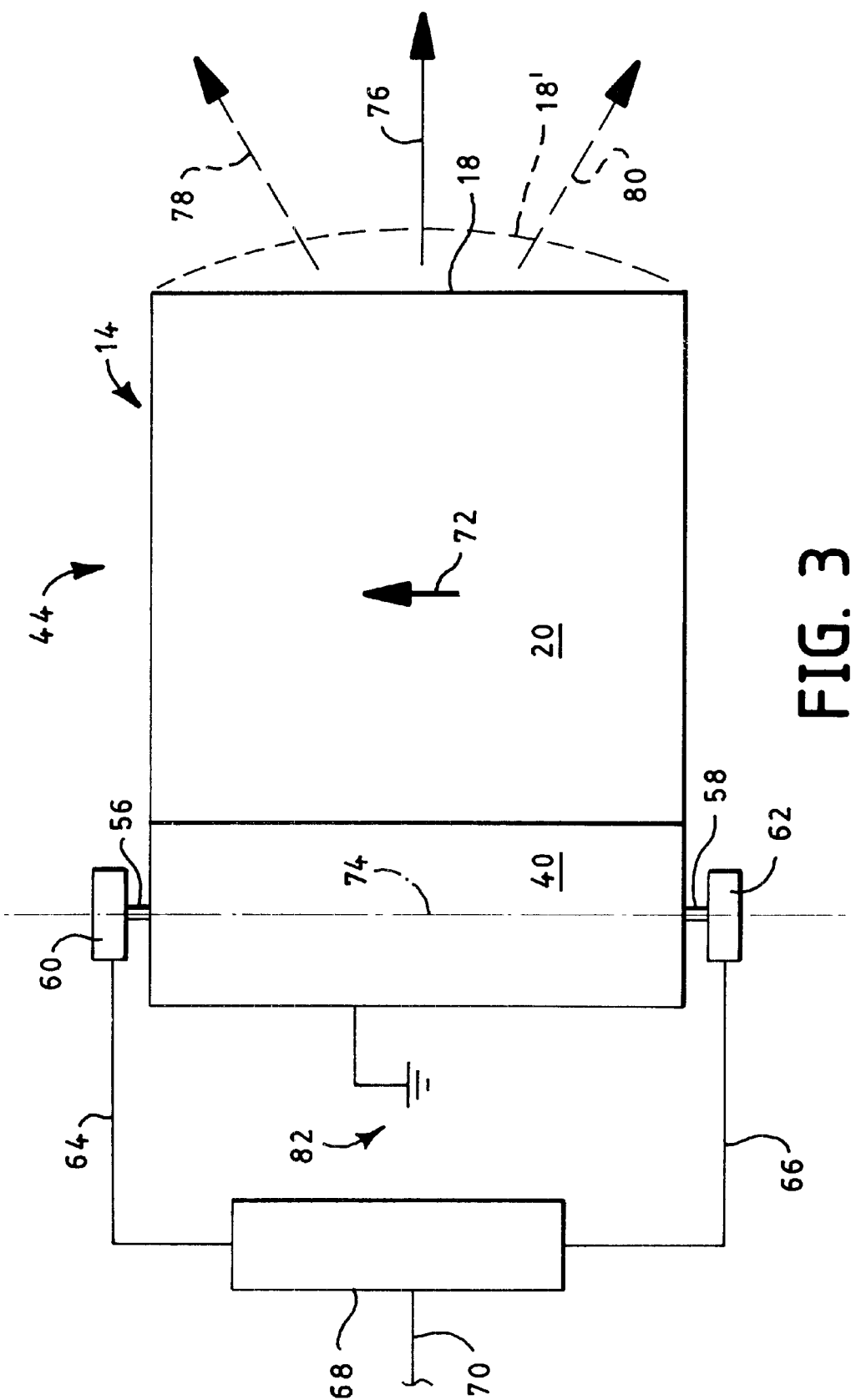
FIG. 3 is a diagrammatic representation of an embodiment of the present invention connected to a wiring system.

FIG. 3 diagrammatically illustrates the lamp assembly 44 of the present invention connected to the wiring system of an automobile, not shown. In particular, conventional male prongs 56, 58 of the elongated neon lamp 12 are electrically and mechanically connected to conventional female connectors 60, 62, respectively, such connectors being electrically connected by conductors 64, 66, respectively, to a conventional lamp ballast 68. Lamp ballast 68 is electrically connected to the automobile wiring system at 70 in a conventional manner.

In the embodiment illustrated in FIGS. 1 to 3, the input surface 16 and the output surface 18, viewed in direction 72 which is parallel to the longitudinal axis 74 of lamp 12, are axially straight. In such configuration, light projected by the lamp 12 through the light bar 14 will be projected from the output surface 18 in a direction 76. Direction 76 is perpendicular to lamp axis 74. If it is desired to alter the direction in which the light is projected from the output surface 18, the contour of the output surface may be altered as desired. For example, FIG. 3 illustrates in phantom lines an output surface 18' which in the direction 72 is curved. In particular, output surface 18 curves convexly away from axis 74. In such configuration, the light projected by lamp 12 is projected from output surface 18 in such a manner as to spread the light in directions 78 and 80. In this manner, the direction in which light is projected from the light bar at output surface 18 may be controlled as desired by configuring the output surface as required.

In considering the lamp device of the present invention illustrated in FIGS. 1 to 3, the metallic layers 32, 34, 36 and 38 are grounded to provide relatively narrow ground plains which collect the electro-magnetic interference and provide a narrow corridor between which the light from the lamp 12 is projected unrestricted through the optically clear polycarbonate. The degree to which the electro-magnetic interference is collected may be controlled by the length and height of the light bar 14. A relatively long and narrow corridor through which the light travels will significantly reduce, if not eliminate, electro-magnetic interference. The degree to which the electro-magnetic interference is collected may be further facilitated by electrically grounding the metal bracket 40 as schematically illustrated at 82 in FIG. 3. Since the metal bracket 40 is in mechanical and electrical contact with the metallic layers 32, 34, 36 and 38, electrically grounding the bracket also electrically grounds the layers. In the absence of such contact, the layers 32, 34, 36 and 38 may be grounded independent of the bracket 40 as illustrated in FIG. 1.

The lamp device of the present invention is not limited to the straight light bar 14 illustrated in FIGS. 1 to 3. Other configurations may be provided as desired. For example, FIG. 4 illustrates a lamp assembly 44' having a curved light bar 14'. Lamp assembly 44' is identical to lamp assembly 44 with the exception that the light bar 14' includes a first length 84 which extends at a right angle 86 relative to a second length 88. Other angular and/or curved orientations may be provided if desired.

Fabrication of the lamp device and lamp assembly of the present invention may be effected in a conventional manner. For example, with reference to FIGS. 1 and 2, the light bar 14 may be fabricated from a piece of high quality optically clear polycarbonate which is machined and polished on one end to provide the input surface 16 so that it conforms to the outer diameter contour of the neon lamp 12 at portion 16'. The output end 18 may also be polished. In one example, the lamp had a 5.0 millimeter (0.19 inch) outside diameter, and was about 457 milllimeters (18.0 inch) long. The light bar 14 was formed from clear polycarbonate, and was about 7.93 millimeters (0.3125 inch) thick, 457 milllimeters (18.0 inch) long, and 101 millimeters (4.0 inch) deep. The surfaces 28, 30 32 and 34 may be metalized with a reflective conductive material such as aluminum. In one example, aluminum foil was used with a thickness of about 0.76 milllimeters (0.003 inch). The metal bracket 40 may be formed from a conductive resilient metal or metalized material which may be bent, stamped or otherwise shaped into a resilient C-shaped clip the portion 46 of which provides a surface which conforms to the outer diameter contour of the neon lamp 12 at portion 46'. The C shaped clip may be fitted to detents or a groove formed in the light bar. Spring tension of the C shaped clip then retains the clip on the light bar. Alternatively, metal foil or direct metalization of the lamp rear may be used. The C-shaped bracket or clip 40 may then be placed around the neon lamp 12 at portion 46' and resiliently clipped or otherwise attached to the light bar 14. To this end, the portions 48 and 50 are dimensioned and spaced from each other to conformally mate with the lengths 52 and 54, respectively, of the exterior layers 32 and 34. The bracket or clip 40 may be held in place relative to the light bar 14 as a result of the resiliency of the clip causing the portions 48 and 50 to by urged against the lengths 52 and 54. The portions 48 and 50 may be attached to respective lengths 52 and 54 by soldering, welding or forming other connections therebetween if desired. The bracket 40 and input surface 16 of the light bar 14 are dimensioned such that when the lamp 12 is positioned therebetween, the portion 16' of the lamp 12 will be in contact with the input surface 16 throughout its length. During use, the bracket 40 supports the lamp 12 relative to the light bar 14, shields the electro-magnetic interference at the rear portion 46' of the lamp, and redirects light into the light bar at input surface 16. The clamping action of the bracket 40 at the interfaces between portions 48, 50 and lengths 52, 54, respectively, completes the ground connection between the bracket 40, which is electrically grounded at 82, and the metal layers 28, 30, 32 and 34. Due to the fact that the electro-magnetic interference emitted from the lamp is forced to travel along the narrow corridor provided between the metal layers 26, 28, 30 and 32, the electro-magnetic interference will be collected on the conductive layers 28, 30, 32 and 34 resulting in a reduced emission through the output end 18 of the light bar 14. The degree to which EMI is supressed depends not only on the lamp and light bar sturcture, but also the method of lamp operation. Generally, the key factors are the size of the aperture in the lamp, the frequency at which the lamp is operated and the depth of the light bar. The smaller the lamp aperture, the lower the operation frequency, and the greater the depth of the light bar, the less EMI there will be.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. A low pressure discharge lamp assembly, comprising:
    a light transmissive light bar having a light input surface, a light output surface and a body segment extending therebetween, said body segment having at least one guide surface extending between said input surface and said output surface, said guide surface being structured and arranged for reflection of light projected through said input surface into said body segment and to said output surface; and a conductive exterior layer adjacent said guide surface and adapted to be grounded, providing for the collection of electro-magnetic interference, and
    a low pressure discharge lamp coupled to said light bar adjacent said input surface and structured and arranged to project light through said input surface through said light bar to said output surface;
    further including a conductive housing structured and arranged for reflection within said body segment of light projected by, and collection of electro-magnetic interference emitted by, said lamp, said lamp being enclosed between said light bar and said housing;
    wherein said housing includes a metal bracket conformally mating with a portion of said lamp and a portion of said body segment.

2. A low pressure discharge lamp assembly, comprising:
    a light transmissive light bar having a light input surface, a light output surface and a body segment extending therebetween, said body segment having at least one guide surface extending between said input surface and said output surface, said guide surface being structured and arranged for reflection of light projected through said input surface into said body segment and to said output surface; and a conductive exterior layer adjacent said guide surface and adapted to be grounded, providing for the collection of electro-magnetic interference, and
    a low pressure discharge lamp coupled to said light bar adjacent said input surface and structured and arranged to project light through said input surface through said light bar to said output surface;
    wherein said exterior layer is a metalized surface;
    further including a conductive housing structured and arranged for reflection within said body segment of light projected by, and collection of electro-magnetic interference emitted by, said lamp, said lamp being enclosed between said light bar and said housing;
    wherein said housing includes a conductive bracket conformally mating with a portion of said lamp and a portion of said body segment at said layer.

3. The lamp assembly of claim 2 wherein said conductive bracket is adapted to be electrically grounded.

4. The lamp assembly of claim 2 wherein said input surface and said lamp are conformably mated.

5. A low pressure discharge lamp assembly, comprising:
    a light transmissive light bar having a light input surface, a light output surface and a body segment extending therebetween, said body segment having at least one guide surface extending between said input surface and said output surface, said guide surface being structured and arranged for reflection of light projected through said input surface into said body segment and to said output surface; and a conductive exterior layer adjacent said guide surface and adapted to be grounded, providing for the collection of electro-magnetic interference, and
    a low pressure discharge lamp coupled to said light bar adjacent said input surface and structured and arranged to project light through said input surface through said light bar to said output surface;
    wherein said input surface and said lamp are conformably mated.

6. A low pressure discharge lamp assembly, comprising: a light transmissive light bar having a light input surface, a light output surface and a body segment extending therebetween, said body segment having at least one guide surface extending between said input surface and said output surface, said guide surface being structured and arranged for reflection of light projected through said input surface into said body segment and to said output surface; and a conductive exterior layer adjacent said guide surface and adapted to be grounded, providing for the collection of electro-magnetic interference, and
    a low pressure discharge lamp coupled to said light bar adjacent said input surface and structured and arranged to project light through said input surface through said light bar to said output surface,
    wherein said input surface, in a direction parallel to a lamp axis, is axially straight, and the output surface, in said direction, is curved.

7. A lamp device, comprising, a light transmissive light bar structured and arranged for coupling a lamp thereto, said light bar having an input surface, an output surface and a body segment extending therebetween, said body segment being structured and arranged for reflection therein of, and collection of electro-magnetic interference emitted by, light projected through said light bar by said lamp from said input surface to said output surface;

further including a conductive housing structured and arranged for reflection within said body segment of light projected by, and a conductive exterior layer adjacent said guide surface and adapted to be grounded for collection of electro-magnetic interference emitted by said lamp when said lamp is enclosed between said light bar and said housing, and;

wherein said exterior layer is a metalized surface, and said housing includes a conductive bracket structured and arranged to conformably mate with a portion of said exterior layer and a portion of said lamp.

8. A lamp device, comprising, a light transmissive light bar structured and arranged for coupling a lamp thereto, said light bar having an input surface, an output surface and a body segment extending therebetween, said body segment being structured and arranged for reflection therein of, and collection of electro-magnetic interference emitted by, light projected through said light bar by said lamp from said input surface to said output surface;

wherein said body segment comprises a portion having at least one guide surface extending between said input surface and said output surface, and a conductive exterior layer formed on the body segment and adapted to be grounded, said guide surface providing said reflection and said exterior layer providing said collection;

wherein said portion of said guide surface comprises a plastic resin material, and said input surface is structured and arranged to conformably mate with said lamp.

9. A low pressure discharge lamp assembly comprising:

(a) a low pressure discharge lamp having an elongated envelope;

(b) a light transmissive light bar having an input surface, an output surface and one or more guide surfaces extending between said input surface and said output surface providing internal light reflection, a portion of said envelope being conformably mated to said input surface to project light through said light bar and out through said output surface, said guide surfaces having an exterior metalization layer that is adaptable to be grounded to collect electro-magnetic interference; and (c) a housing that is adaptable to be grounded to collect electro-magnetic interference, a portion of said envelope being conformally mated to said housing, said lamp being enclosed between said housing and said light bar.

* * * * *